United States Patent
Heigl et al.

(10) Patent No.: US 7,481,448 B2
(45) Date of Patent: Jan. 27, 2009

(54) VEHICLE ROOF-LINING COMPRISING INTEGRATED LATERAL AIRBAG MODULES FOR THE HEAD

(75) Inventors: Jürgen Heigl, Böbingen (DE); Wolfgang Müller, Wermelskirchen (DE); Ralf Gerecke, Blieskastel (DE); Heinz Eyrainer, Waldstetten (DE); Rainer Heyer, Mutlangen (DE)

(73) Assignees: TRW Occupant Restraint Systems GmbH & Co. KG, Alfdorf (DE); Johnson Controls GmbH, Burscheid (DE)

( * ) Notice: Subject to any disclaimer, the term of this patent is extended or adjusted under 35 U.S.C. 154(b) by 158 days.

(21) Appl. No.: 10/488,830

(22) PCT Filed: Sep. 5, 2002

(86) PCT No.: PCT/EP02/09949

§ 371 (c)(1), (2), (4) Date: Aug. 17, 2004

(87) PCT Pub. No.: WO03/022642

PCT Pub. Date: Mar. 20, 2003

(65) Prior Publication Data

US 2004/0251663 A1    Dec. 16, 2004

(30) Foreign Application Priority Data

Sep. 6, 2001    (DE)    ................ 101 43 760

(51) Int. Cl.
*B60R 21/213*    (2006.01)
*B60R 21/217*    (2006.01)

(52) U.S. Cl. ................ 280/730.2; 280/728.2

(58) Field of Classification Search ............... 280/728.2, 280/728.3, 730.2
See application file for complete search history.

(56) References Cited

U.S. PATENT DOCUMENTS

| | | | | |
|---|---|---|---|---|
| 5,921,575 | A * | 7/1999 | Kretschmer et al. | 280/728.2 |
| 6,070,902 | A * | 6/2000 | Kowalski et al. | 280/730.2 |
| 6,079,732 | A * | 6/2000 | Nakajima et al. | 280/728.2 |
| 6,082,761 | A * | 7/2000 | Kato et al. | 280/730.2 |
| 6,142,506 | A * | 11/2000 | Patel et al. | 280/728.2 |
| 6,142,509 | A * | 11/2000 | White et al. | 280/730.2 |
| 6,149,185 | A * | 11/2000 | White et al. | 280/728.2 |
| 6,170,861 | B1 * | 1/2001 | Tietze | 280/730.2 |
| 6,179,324 | B1 * | 1/2001 | White et al. | 280/730.2 |
| 6,217,061 | B1 * | 4/2001 | Harland et al. | 280/730.2 |

(Continued)

FOREIGN PATENT DOCUMENTS

DE    198 12 737 A1    5/1999

(Continued)

*Primary Examiner*—John Q. Nguyen
*Assistant Examiner*—George D. Spisich
(74) *Attorney, Agent, or Firm*—Tarolli, Sundheim, Covell & Tummino LLP

(57) ABSTRACT

The vehicle headliner has integrated head-side airbag modules. Each module has an elongated accommodation housing (12) for a folded airbag (14). The accommodation housings (12) are arranged along the side edges of the headliner (10). At the side of the headliner (10), the accommodation housing (12) is connected to a support structure (18) that has support ribs and that is joined to the headliner by means of gluing. On the opposite side, facing the vehicle body, the accommodation housing (12) is covered by a further support structure (20) having numerous support ribs.

25 Claims, 3 Drawing Sheets

U.S. PATENT DOCUMENTS

Figure 1:
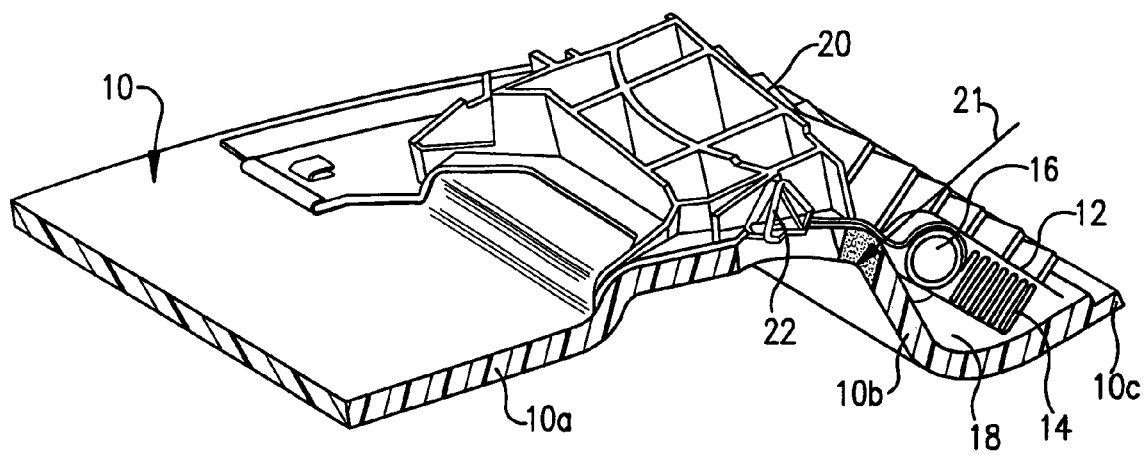

| | | | |
|---|---|---|---|
| 6,227,561 B1 * | 5/2001 | Jost et al. | 280/730.2 |
| 6,231,071 B1 * | 5/2001 | Keane | 280/730.2 |
| 6,257,616 B1 * | 7/2001 | Nowak et al. | 280/730.2 |
| 6,364,349 B1 * | 4/2002 | Kutchey et al. | 280/730.2 |
| 6,439,598 B1 * | 8/2002 | Braun et al. | 280/728.2 |
| 6,733,034 B2 * | 5/2004 | Tiesler | 280/730.1 |
| 6,793,241 B2 * | 9/2004 | Wallner et al. | 280/730.2 |

FOREIGN PATENT DOCUMENTS

| | | |
|---|---|---|
| DE | 199 32 949 * | 2/2000 |
| DE | 199 41 269 A1 | 3/2000 |
| EP | 0 903 268 A1 | 3/1999 |
| WO | WO 99/65759 | 12/1999 |

* cited by examiner

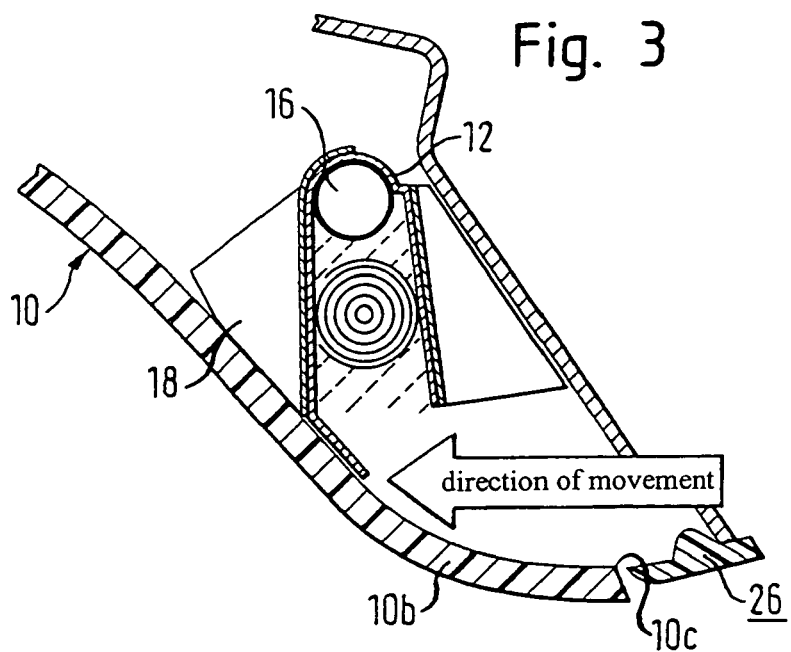
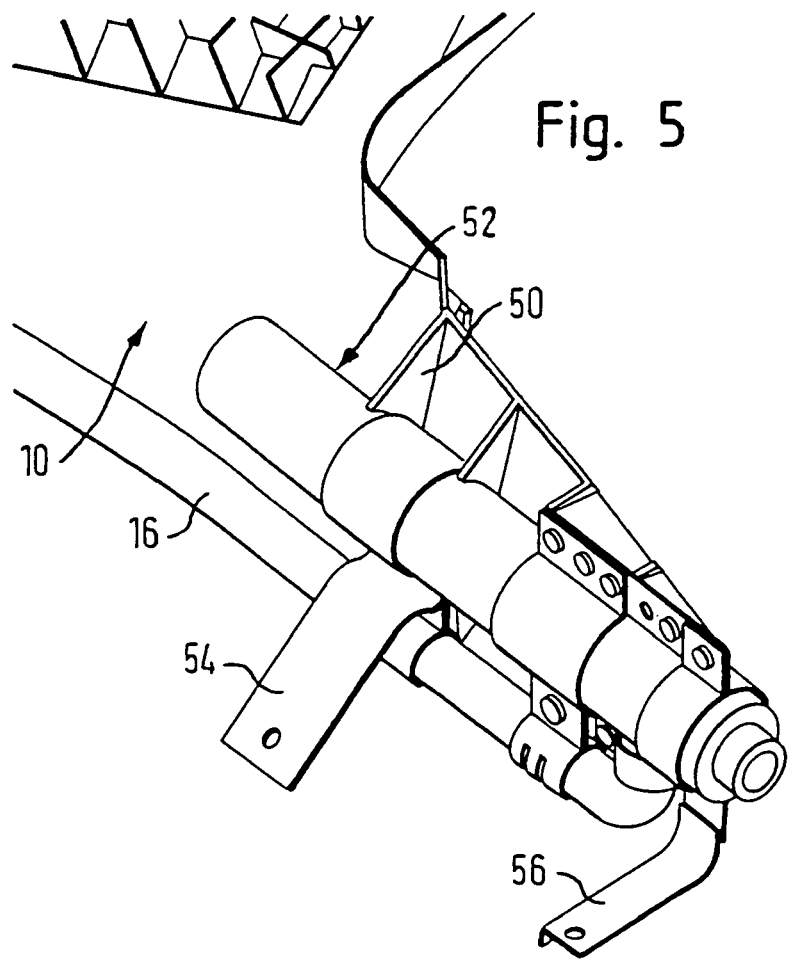

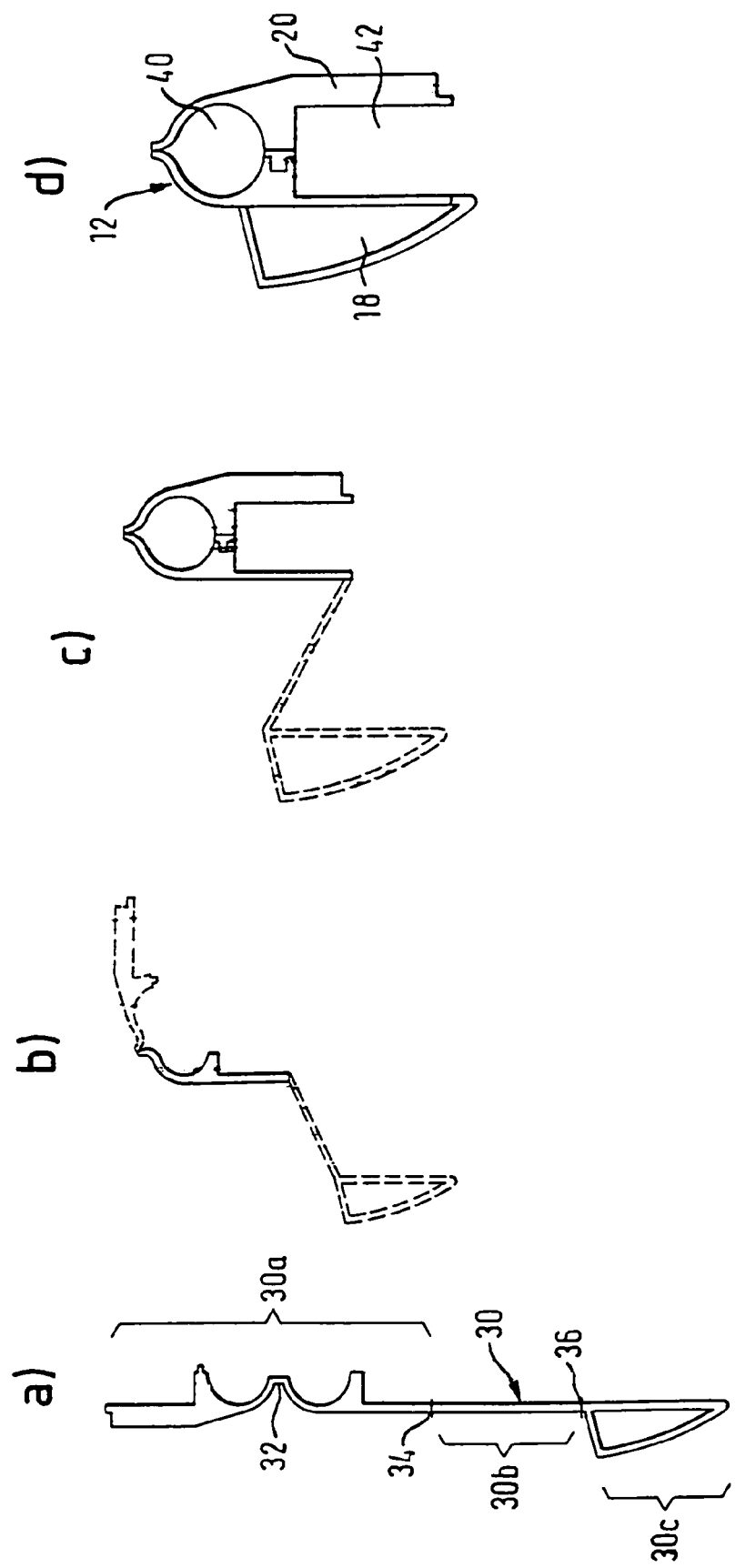

VEHICLE ROOF-LINING COMPRISING INTEGRATED LATERAL AIRBAG MODULES FOR THE HEAD

The invention relates to a vehicle headliner with integrated head-side airbag modules.

Conventional head-side airbag modules are stowed in an elongated accommodation housing along a roof edge of the vehicle, under the headliner. In the activated state, the inflated airbag extends like a curtain from the A-column to the C-column and covers the side windows as well as the B-column. The folded airbag, along with a gas distribution tube, is arranged in the accommodation housing that forms an ejection channel. A generally pyrotechnical gas generator is connected to one free end of the gas distribution tube. The accommodation housing, together with the folded airbag and the gas distribution tube, makes up an autonomous assembly that is mounted under the roof edge of the vehicle before the headliner is put into place.

The invention proposes integrating the head-side airbag modules into the vehicle headliner. The headliner is installed in the vehicle as an entire assembly, along with the integrated airbag modules. This translates into considerable savings during the assembly at the automobile manufacturer and into a more precise placement of the airbag modules in the vehicle since assembly tolerances are eliminated. The elongated accommodation housings, each for one folded airbag, are arranged along the side edges of the headliner. In the preferred embodiment, the accommodation housings are joined to the headliner, in particular by gluing. In this manner, the position of the accommodation housings relative to the headliner is determined precisely. The set consisting of the headliner and the accommodation housings forms a rigid, easily handled assembly.

An especially advantageous further development of the invention consists in that, towards the side of the headliner, the accommodation housings are each connected to a support structure that has support ribs and that, in turn, is joined to the headliner. Also, towards the side of the vehicle body, the accommodation housings are preferably connected to a support structure that has support ribs and that is connected to the vehicle body. The support structures provided with numerous support ribs not only reinforce the headliner but rather, the headliner thus configured also offers excellent impact protection that absorbs energy through plastic deformation.

Further characteristics and advantages of the invention ensue from the description below of preferred embodiments and from the accompanying drawings to which reference is made.

Figure 2:
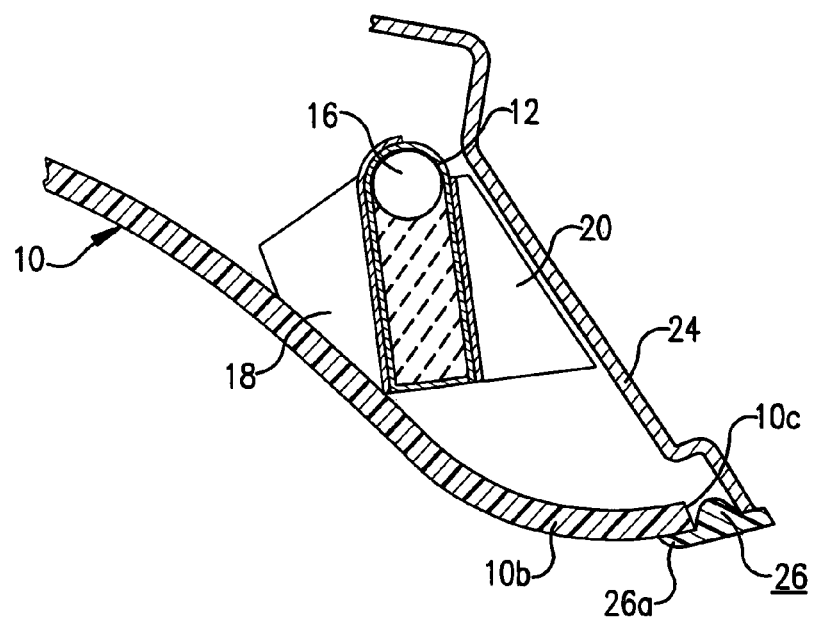

The drawings show the following:

FIG. 1—a section of a vehicle headliner in a perspective view according to a first embodiment of the present invention;

FIG. 2—a sectional view of the headliner in the normal state according to a second embodiment of the present invention;

FIG. 3—a sectional view of the headliner of the second embodiment after activation of the head-side airbag module that is integrated therein;

FIGS. 4a to 4d—schematic sectional views of a shaped part from which an accommodation housing for a folded airbag is formed by folding over along hinge lines according to a third embodiment of the present invention; and FIG. 5—a perspective partial view of a projection portion of the headliner of any of the embodiments of FIGS. 1-4d with a gas generator arranged on it.

The section of a headliner for vehicles according to a first embodiment shown in FIG. 1 corresponds to a side edge area under a roof edge of the vehicle body. The headliner consists of a foamed plastic plate 10 with a flat middle area 10a and a curved edge area 10b. Towards the vehicle body, the curved edge area 10b forms a generally groove-shaped space that accommodates an elongated accommodation housing 12 having a U-shaped cross section for a folded airbag 14. The accommodation housing 12 has two parallel legs that are connected by a curved base. Arranged in the area of the curved base is a gas distribution tube 16 that extends across the entire length of the accommodation housing 12.

On its side facing the headliner, the accommodation housing 12 is connected to a support structure 18 that lies against the adjacent leg of the accommodation housing; the support structure 18 has a multitude of support ribs spaced apart in the lengthwise direction of the accommodation housing 12 and is joined to the headliner 10 by means of gluing. A further support structure 20, which is formed by a multitude of support ribs, is located on the side of the accommodation housing 12 that faces the vehicle body. The support structure 20 is joined to the leg of the accommodation housing 12 that faces away from the headliner 10. The support structure 20 covers the accommodation housing 12 completely and extends beyond it towards the middle of the vehicle. The part of the support structure 20 that projects beyond the accommodation housing 12 is connected over its surface with the headliner 10, especially by means of gluing. Latching elements are provided in order to attach the headliner to the vehicle body; FIG. 1 shows just one such latching element, designated with the reference numeral 22. The latching elements 22 are inserted into appropriate attachment holes in the vehicle body and pressed into place. This results in the envisaged precise fit without any additional measures.

As shown in FIG. 2, according to a second embodiment, a weatherstrip 26 is placed on the roof edge of the vehicle body 24, a lip 26a of said weatherstrip extending beyond the side edge 10c of the headliner 10. When the pyrotechnical gas generator that is connected to the free end of the gas distribution tube 16 is activated, the legs of the accommodation housing 12 are forced apart, as shown in FIG. 3, the leg of the accommodation housing 12 that presses on the headliner 10 via the support structure 18 moving the side edge area 10b of the headliner 10 towards the middle of the vehicle. The side edge 10c of the headliner 10 is then freed from the weatherstrip 26 so that the headliner 10 can yield further and can get out of the way of the airbag which is now unfolding. Due to the U-shaped cross section of the accommodation housing 12, an ejection channel is formed, which aligns the unfolding airbag in the desired unfolding direction.

In the embodiment shown in FIG. 1, the support structure 20 is provided with a folding line formed by a reduction in the material thickness along the transition to the accommodation housing 12, said folding line being marked by an indication arrow 21 in FIG. 1 and visualized by a dotted area. The headliner 10 is then also unfolded along this folding line when the airbag module is activated.

An energy-absorbing impact protection is created by the connection of the headliner and the support structure with the support ribs.

In the third embodiment shown in FIG. 4, the accommodation housing 12—together with at least parts of the support structures 18, 20—is formed of a generally flat shaped body, as shown in FIG. 4a. The shaped body, generally designated with the reference numeral 30 in FIG. 4a, is made of plastic by means of injection molding in the form of an elongated, flat profile part. The shaped body 30 has a first area 30a in the middle of which a hinge line 32 is formed, a second area 30b that is formed by connection webs and a third area 30c which makes up the support structure 18 facing the headliner. At the transition between the areas 30a and 30b, there is a second hinge line 34. A third hinge line 36 is located at the transition between the areas 30b and 30c. The two halves of the area 30a are complementary and, when they are folded over onto each other, they together form the accommodation housing 12. FIGS. 4b, 4c and 4d show how the various areas 30a, 30b and 30c are folded over together at the hinge lines 32, 34 and 36 in order to create the accommodation housing 12 as well as at least parts of the support structures 18, 20 out of one single shaped body.

Another special feature that can be seen in FIG. 4 is the design of the inside of the accommodation housing 12. The halves of the area 30a of the shaped body 30 that are folded over onto each other form a hollow-cylindrical accommodation space 40 at the base for the gas distribution tube 16 and, adjacent to that and separated by webs folded onto each other, a generally cuboid accommodation space 42 for the folded airbag.

As can be seen in FIG. 5, at the transition to the C-column of the vehicle body, the headliner 10 has a projection 50 on which a pyrotechnical gas generator 52 is situated. The gas generator 52 is connected to the free end of the gas distribution tube 16. The gas generator is attached to the vehicle body by means of two metal fastening plates 54, 56.

The invention claimed is:

1. A method for producing a head-side airbag module for integration along a side edge portion of a vehicle headliner, comprising the following steps:

providing first and second body parts connected to each other by a first hinge line that runs in a lengthwise direction of the accommodation housing, said first and second body parts each comprising a semi-cylindrical portion, an airbag receiving portion, and a portion of reduced material thickness between the semi-cylindrical portions, said portion of reduced material thickness comprising the first hinge line; and folding said accommodation housing about the first hinge line so that said semi-cylindrical portions engage each other and define a closed hollow cylindrical accommodation space for receiving a gas distribution tube, said airbag receiving portions together defining an accommodation space for receiving a folded airbag.

2. The method for producing an accommodation housing recited in claim 1, further comprising the step of arranging said airbag modules along the side edges of said headliner.

3. The method for producing an accommodation housing recited in claim 1, wherein said step of providing said first and second body parts comprises the steps of:

providing a first support structure formed at least partially as a portion of said first body part, said first support structure being adapted for connection to the headliner; and providing a second support structure formed at least partially as a portion of said second body part, said second support structure being adapted for connection to a body of the vehicle.

4. A head-side airbag module for integration along a side edge portion of a vehicle headliner, said head-side airbag module comprising:

an accommodation housing for receiving an airbag, said accommodation housing comprising first and second body parts connected to each other by a first hinge line that runs in a lengthwise direction of the accommodation housing, said first and second body parts each comprising a semi-cylindrical portion, an airbag receiving portion, and a portion of reduced material thickness between the semi-cylindrical portions, said portion of reduced material thickness comprising the first hinge line, said accommodation housing being folded about the first hinge line so that said semi-cylindrical portions engage each other and define a closed hollow cylindrical accommodation space for receiving a gas distribution tube, said airbag receiving portions together defining an accommodation space for receiving a folded airbag.

5. The head-side airbag module according to claim 4, further comprising:

a first support structure formed at least partially as a portion of said first body part, said first support structure being adapted for connection to the headliner; and a second support structure formed at least partially as a portion of said second body part, said second support structure being adapted for connection to a body of the vehicle.

6. The head-side airbag module according to claim 5, wherein said accommodation housing when folded about said first fold line forming an elongated open ejection channel having a U-shaped cross section comprising a first leg that faces away from said headliner and a second leg that faces towards said headliner, said first support structure being joined to said first leg of the accommodation housing and extending beyond the accommodation housing towards the longitudinal centerline of the vehicle.

7. The head-side airbag module according to claim 5, wherein said second support structure comprises support ribs.

8. The head-side airbag module according to claim 5, wherein the second support structure is adapted to be connected to the vehicle body such that the headliner with the airbag module is mounted as a whole onto the vehicle body.

9. The head-side airbag module according to claim 5, wherein the first support structure has a multitude of support ribs spaced apart from each other in the lengthwise direction.

10. The head-side airbag module according to claim 9, wherein the first support structure is made in one piece with the accommodation housing.

11. The head-side airbag module according to claim 5, wherein the first hinge line extends between and connects the semi-cylindrical portions of said first and second body parts.

12. The head-side airbag module according to claim 11, further comprising a second hinge line along an edge of said first body part opposite said first hinge line, said second hinge line connecting said first support structure to said first body part, said first support structure being adapted to be folded relative to said first body part about said second hinge line to engage said first body part.

13. The head-side airbag module according to claim 11, wherein connection webs are connected to said first body portion via a second hinge line.

14. The head-side airbag module according to claim 11, wherein the semi-cylindrical portions of the first and second body parts engage and interlock with each other at ends of said semi-cylindrical portions opposite said first fold line.

15. The head-side airbag module according to claim 14, wherein the first and second body parts define an essentially rectangular parallelepiped accommodation channel for the folded airbag when the semi-cylindrical portions of the first and second body parts engage and interlock with each other.

16. The head-side airbag module according to claim 14, wherein, on a projection of the headliner facing a C-column of the vehicle, there is arranged a gas generator connectable with an end of a gas distribution tube that protrudes from the accommodation housing.

17. The head-side airbag module according to claim 16, wherein the gas generator is provided with attachment elements for attaching said gas generator to the C-column of the vehicle.

18. The head-side airbag module according to claim 5, wherein said headliner comprises an edge strip that extends beyond the accommodation housing towards the middle of the headliner, said first support structure being joined to said edge strip of the headliner.

19. The head-side airbag module according to claim 5, wherein the first support structure is glued across the entire surface of said first support structure to the headliner.

20. The head-side airbag module according to claim 5, wherein said first support structure has support ribs, said headliner when connected to said first support structure forming an energy-absorbing impact protection structure.

21. The head-side airbag module according to claim 5, wherein the first support structure is provided with a folding line having a reduction of the material thickness, said headliner folding aside along said folding line after activation of the airbag module.

22. The head-side airbag module according to claim 4, further comprising a rigid gas distribution tube arranged within the accommodation housing.

23. An apparatus comprising:
a vehicle headliner; and
at least one head-side airbag module integrated with said headliner, said head-side airbag module formed as a one-piece molded article comprising:
a first area comprising complimentary first and second halves, each half comprising a semi-cylindrical portion, the first area further comprising a portion of reduced material thickness between the semi-cylindrical portions, the portion of reduced material thickness comprising a first fold line, said first area being folded about said first fold line to bring said complimentary halves into engagement with each other to define an accommodation housing, said accommodation housing comprising a first portion for receiving a head-side airbag a second portion for receiving a gas distribution tube;
a second area connected to said first area along one of said first and second halves by a second fold line, said second area comprising a plurality of connection webs; and
a third area connected to said second area by a third fold line, said third area comprising a plurality of support ribs and defining a support structure;
said one-piece molded article being folded about said second and third fold lines to position said second area sandwiched between said accommodation housing and said support structure, said support structure being secured to said headliner to integrate said head-side airbag module with said headliner.

24. The apparatus according to claim 23, wherein said semi-cylindrical portions of said complimentary first and second halves together define a substantially cylindrical hollow elongated accommodation space for receiving a gas distribution tube.

25. The apparatus according to claim 23, wherein said complimentary first and second halves of said first area each comprise portions that together define a rectangular hollow elongated accommodation space for receiving a folded airbag.

* * * * *